April 21, 1970  TADASHI GOTO  3,507,569
MOTION PICTURE FILM EDITOR OR VIEWER
Filed Jan. 5, 1967  3 Sheets-Sheet 1
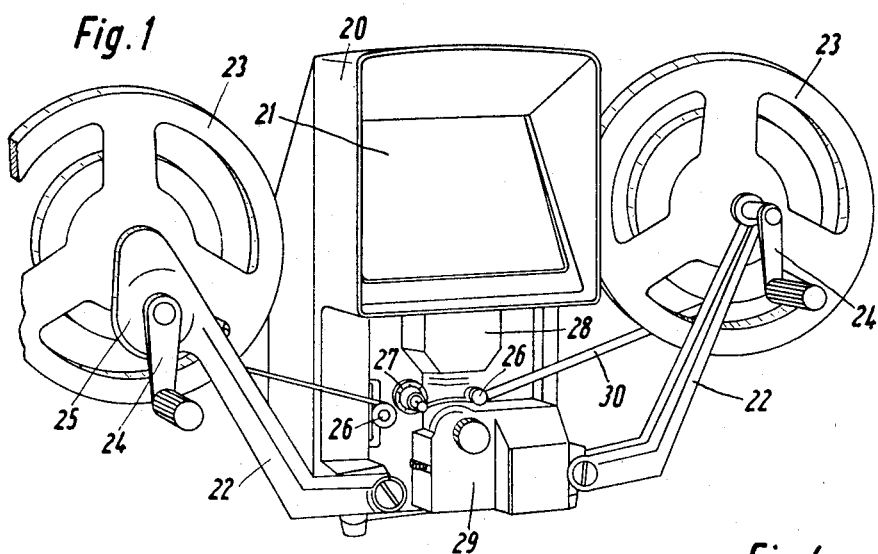
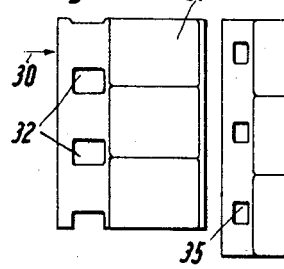
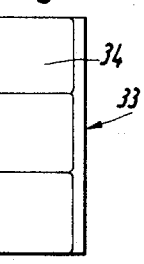
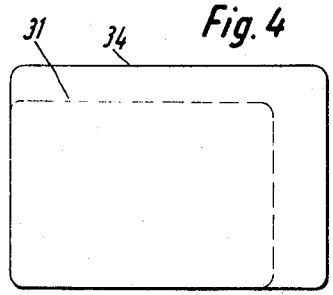
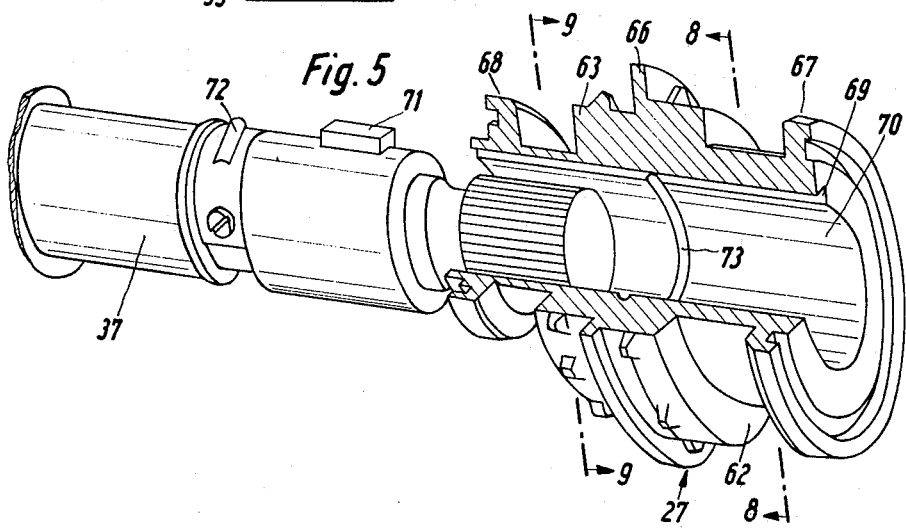

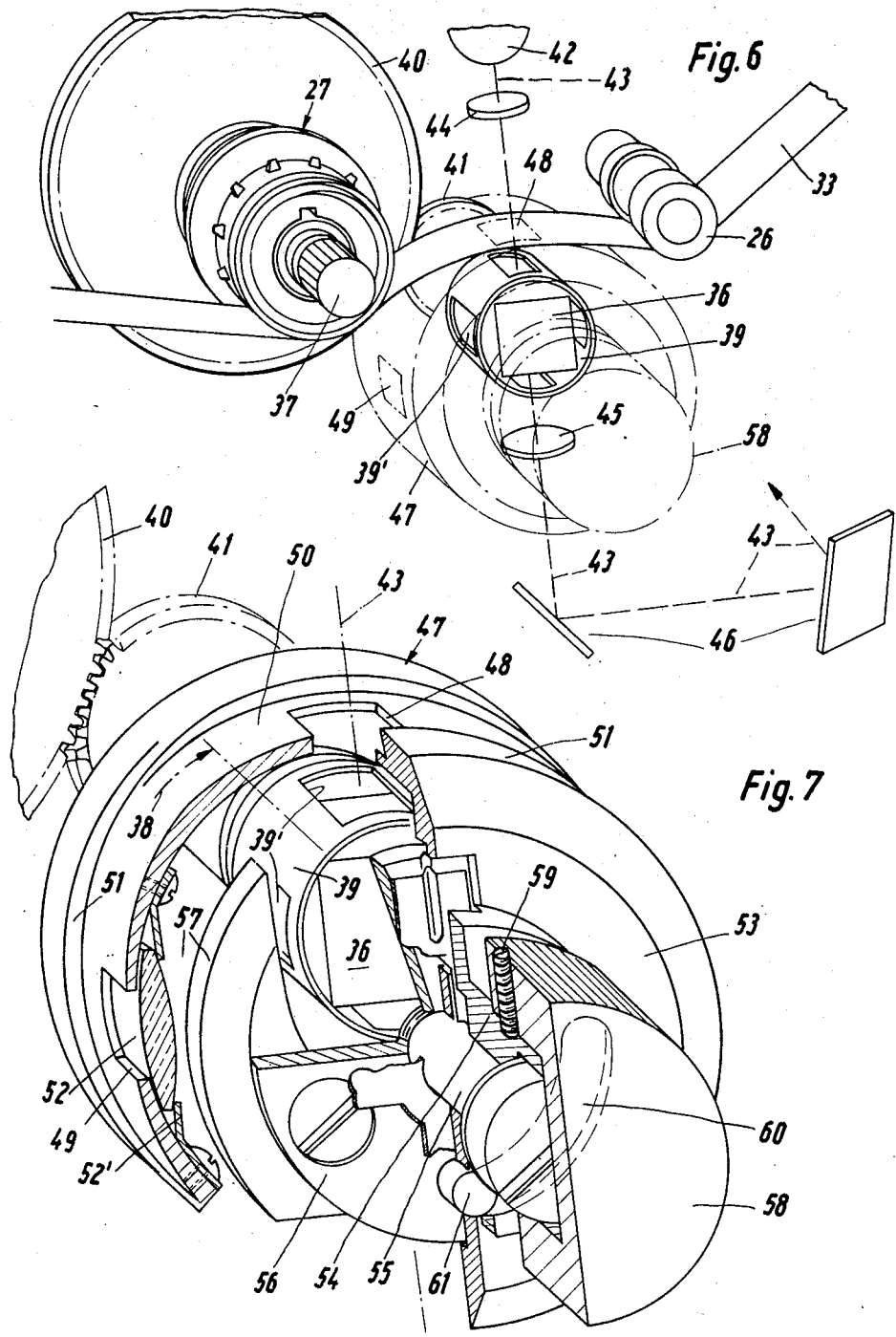

United States Patent Office 3,507,569
Patented Apr. 21, 1970

3,507,569
MOTION PICTURE FILM EDITOR OR VIEWER
Tadashi Goto, 159 Kita Terao, Tsurumi-ku,
Yokohama, Japan
Filed Jan. 5, 1967, Ser. No. 607,468
Claims priority, application Japan, Feb. 4, 1966,
41/6,116; Feb. 25, 1966, 41/11,240
Int. Cl. G03b 21/00
U.S. Cl. 352—129
8 Claims

ABSTRACT OF THE DISCLOSURE

A film editor having a prism rotated synchronously with the film movement and arranged behind the film in the path of light projecting the film images on a viewing screen, the editor being compatible for viewing different film sizes, such as Single-8 and Super-8, by an optical system variably insertable between film and prism for bringing the projections of the film images on the prism to the same size. The editor having alternatively operative sprocket wheels for synchronising film movement and prism rotation, each wheel being adapted to the image sizes and perforations of one of the different films.

---

Figure 8:
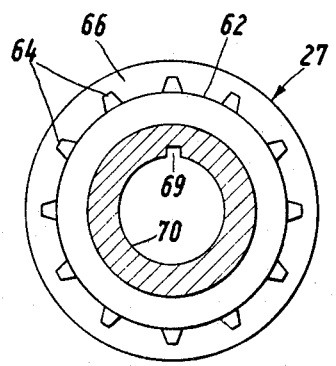

The invention relates to a film editor or viewer, i.e. an apparatus for viewing a film like by a regular projector and for stopping it at selected locations.

The known apparatus of this type move the film between a source of light and a prism, the latter being rotated synchronously with the film movement and having faces parallel to one another, and the film being projected via lenses and mirrors to a viewing screen. These known devices had the prism, the remainder of the optical system and the drive for the prism adapted for one size of film, and for different films, each having different size images or frames and perforations, a separate editor had to be used. It has been regarded as practically impossible to use for films with different sizes of images but one prism and therefore but one editor. This proved particularly obnoxious since aside from the "Regular," "Normal" or "Double" 8 mm. film the "Super" or "Single" 8 mm. film appeared on the market and has found wide acceptance.

The known type of editor is, in accordance with the present invention, adapted to different film sizes, i.e. particularly to "Regular 8" and "Super 8," thereby that an optical device or system is inserted between film and prism, which brings the projections of different size pictures or frames to the same size, i.e. so to speak on a common denominator, before they reach the prism.

According to a further feature of the invention, different film transport devices are provided, of which one each is adapted to one of the different films. The tooth spacings and the sizes of the sprocket wheels, driving the prism via gears, are such as to maintain synchronism of movement of film and prism for the different frame sizes and perforations of the different films.

The optical system, bringing the projections of different films to the same size, may be formed in a variety of manners. A lens may either be placed behind the pictures of the one film, which brings the projections of the pictures of such film either by reduction or by enlargement, respectively, to the same size as the projections of the pictures of the other film, or different lenses may be placed is each case behind both films, one of which reduces so that again the projections of the pictures of both films will have, upon meeting the prism, the same size.

The problems and features of the invention, hereinbefore briefly outlined, as well as details of the invention and other noteworthy observations will be more easily understood or derived from the following description of one embodiment of the invention, which is illustrated in the attached drawing.

In the drawing is:

FIG. 1 is a diagrammatic perspective of an otherwise known editor, which is modified to incorporate the invention;

FIG. 2 a short piece of a "Regular-8" film;

FIG. 3 a short piece of a "Super-8" film on the same scale as FIG. 2;

FIG. 4 a comparison of the relative sizes of the individual images or frames of Regular-8 and Super-8 films;

FIG. 5 a diagrammatic perspective illustrating the film movement and the path of light across film and prism;

FIG. 6 a perspective, similar to but at a larger scale than FIG. 5, showing more details;

FIG. 7 a perspective, partly sectionalized, showing the reversible sprocket wheels for the different films and the shaft carrying them;

FIG. 8 a section along line 8—8 of FIG. 7.

Figure 9:
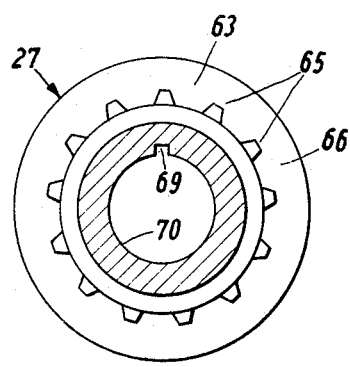
Figure 10:
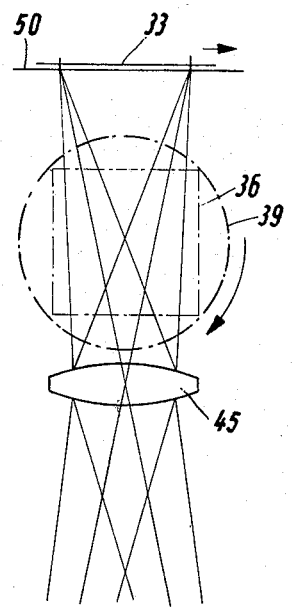
Figure 11:
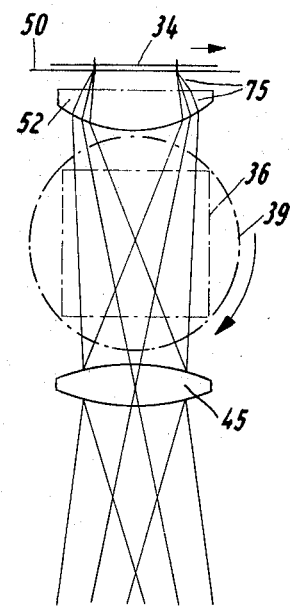
Figure 12:
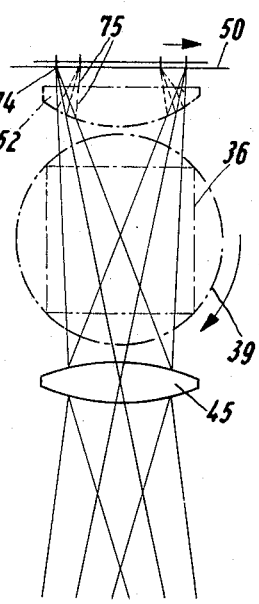

FIG. 9 a section along line 9—9 of FIG. 7;

FIG. 10 a schematic representation of the path of the light when using the editor for Super-8 film;

FIG. 11 a representation corresponding to FIG. 10, however when using the same editor for Regular-8 film; and FIG. 12 a superimposed representation of the light paths according to FIGS. 10 and 11 in using dotted lines for the light path for Regular-8 film.

The editor or viewer illustrated in FIG. 1 comprises a main housing 20 with a ground glass screen 21, two legs 22 for rotatably supporting film reels 23 and cranks 24, one of the latter being combined for rewinding with a speed-up gear in housing 25. Deflection rolls 26, sprocket 27, a source of light arranged in housing 29, and lenses and deflection mirrors arranged in the housings 20, 28 and 29 serve in usual manner for guiding the film and for its projection onto screen 21. The details of the just briefly mentioned, known devices and the features of the invention will be described in the following, reference being had to the succeeding figures.

The Regular-8 film 30, assumed to be used in FIG. 1 and shown in FIG. 2, has pictures, images or frames 31 and marginal perforations 32, whereas the Super-8 film 33, shown in FIG. 3, has frames or pictures 34 and marginal perforations 35. The super-imposition in FIG. 4 clearly shows that the images 34 of the Super-8 are larger than the images 31 of the Regular-8. Moreover, comparison of FIGS. 2 and 3 shows that the marginal perforations 35 of the Super-8 are smaller and more widely spaced than the perforations 32 of the Regular-8.

Assuming a Super-8 film is moved in FIGS. 5 and 6 via rolls 26 and sprocket wheel, designated as a whole by numeral 27, past prism 36, shaft 37 of sprocket wheel 27 and the shaft 38 (indicated merely by a dot-and-dash line) of prism 36, carry gears 40 and 41, respectively, so that movement of film 33 causes synchronous rotation of prism 36 and its supporting hollow cylinder 39 provided with openings 39'.

Light emanating from light source 42 and indicated by dotted line 43 reaches film 33 via condenser lens 44 and after passing prism 36 and focussing lens 45 via mirrors 46 and a further (not shown) mirror in housing 20 the screen 21.

As shown in FIGS. 5 and 6, a slide or cylinder 47 is arranged in front of prism 36, in accordance with the invention. The dimensions of openings 48 and 49, respectively, in cylinder 47 correspond to the sizes of the images 34 of Super-8 films and of the images 31 of Regular-8 film, respectively. Quarter-cylinder 47 is provided with a circumferential recess 50 between raised marginal parts 51, serving together for supporting and guiding the film. Whereas opening 48 for Super-8 is free or unobstructed, a convex enlarging lens 52 is arranged behind opening 49 for Regular-8. Lens 52 is held by clip 52'. The purpose of this lens will be explained later on in connection with the paths of the light illustrated in FIGS. 10–12 and it suffices to state here, that cylinder 47 is pivotable about approximately 90° so that either free opening 48 or opening 49 with its lens 52 is in the path of the light.

Cylinder 47 has an outer end wall 53 provided with a hub 54 which is rotatably mounted on a stationary bolt or shaft 55 concentrically arranged to shaft 38 of the prism. Bolt 55 is secured in end wall 56 of a stationary part 57 partly surrounding the prism and attached (in a manner not shown) to main housing 20. A control knob 58 is secured by screw 59 to hub 54 so as to rotate cylinder 47. Movement of cylinder 47 is limited by a quarter-circle slot 60 in end wall 53 and post 61 projecting from wall 56 and engaging slot 60.

Sprocket wheel 27 attached to shaft 47 consists of two rigidly interconnected sprocket wheels 62 and 63 provided with teeth 64 and 65, respectively, and separated by collar 66. The diameters of the base circles of these sprocket wheels and of the film supporting collars 67 and 68, respectively, spaced from them, and the spacings of their teeth 64, 65 are such that the larger sprocket wheel 62 corresponds to Super-8 film and sprocket wheel 63 to Regular-8 film, and so that these wheels rotate prism 36 via gears 40, 41 synchronously with the sequence of the images or frames of the respective film.

Sprocket wheel unit 27 has an inner bore 70 provided with a keyway 69 and is slideable onto shaft 37. Shaft 37 engages keyway 69 by means of projection 71, and a resilient projection 72 provided on shaft 27 midways of its length is adapted to engage a circumferential groove 73 of bore 70 so as to retain releasably sprocket wheel unit 27. Sprocket wheel unit 27 may be placed on shaft 37 either with sprocket 62 or 63 to the front, depending on whether a Super-8 or a Regular-8 film is to be viewed.

When a Super-8 film is to be viewed unit 27 is slid onto shaft 27 so that sprocket wheel 52 is in front, and cylinder 47 is turned by knob 58 into the position shown in FIG. 6. When however a Regular-8 film is to be viewed, sprocket wheel 63 is brought to the front and cylinder 47 is turned by knob 58 in clockwise direction until opening 49 with lens 52 is in path 43 of the light.

As emphasized hereinbefore, the apparatus constructed in accordance with the present invention, serves for bringing the projections of the images or frames 31 and 34 of Regular-film 30 and Super-film 33, respectively, to the same size before they enter prism 36 because one prism 36 can only be built for one definite picture width, the latter meaning the dimension in the direction of the film's movement. This influencing of the paths of the light rays is illustrated in FIGS. 10 to 12, the known deflection of the rays in the prism, which is of no interest here, not being illustrated.

In the arrangement per FIG. 10, Super-8 film 33 moves past opening 48 of support 50 and light rays 74 reach unimpededly, i.e. without deflection, prism 36. For viewing Regular-8 film, illustrated in FIG. 11, enlarging lens 52 is however inserted between opening 49 of film support 50, which lens so enlarges the projection, indicated by lines 75, of picture 31 that it attains the same size as that of Super-8 film shown in FIG. 10. Upon leaving lens 52, the path of rays 75 becomes identical with that of rays 74 of Super-8 film. For further clarification, FIG. 12 shows both paths 74, 75 superimposed the one on the other.

As mentioned in the beginning, the invention is not restricted to the illustrated embodiment but many modifications, adaptations and the like will easily present themselves to the expert in the art. For this, without intended to be exhausting, some examples will be indicated in the following. In place of the rotatable slide 47 it is possible to use longitudinally or transversely movable slides. In place of constructing the editor for Super-8 film at the outset it also could be constructed for Regular-8 film, whereupon a concave or reducing lens would be inserted between the pictures of Super-8 film and the prism. Finally, the editor might not be constructed for either one of the films and two lenses could bring the images of the different films to the side adapted for the prism. It is to be emphasized however that the construction of the editor for the larger pictures and the insertion of an enlarging lens between the smaller pictures and the prism is considered to be the most advantageous one. Instead of the reversible sprocket wheels 62, 63 but one axially movable wheel with two rows of teeth might be provided in arranging a supporting surface for the film, which presents the latter either to the one or to the other one of the rows of teeth, depending upon whether a Super-8 or a Regular-8 film is to be viewed.

Finally, the invention is of course in general in its application not restricted to the specific known formation of an editor or viewer, as it is shown in FIG. 1.

What is claimed is:
1. A motion picture film editor comprising:
 (a) a prism having pairs of faces arranged oppositely and parallel to each other,
 (b) means for rotating said prism about an axis extending parallel to and midways between said faces,
 (c) means adapted to move a film across an optical path intersecting the prism faces,
 (d) means for synchronizing rotation of said prism and movement of film,
 (e) an image size changing lens system adapted to be moved into and out of the optical path intersecting the prism faces,
 (f) whereby the editor is compatible for viewing different size films.
2. The editor of claim 1 including,
 (a) means for supporting a film, said film support means also carrying said lens system of (e).
3. The editor of claim 2, wherein said means for supporting film is defined by peripheral portions of a cylindrical body having an axis of rotation generally coincident with the axis of rotation of the prism, the lens system being moved into and out of the optical path by rotation of the cylindrical body.
4. The editor of claim 1, wherein said lens system is defined by a single lens.
5. The editor of claim 1, wherein said lens system is defined by a plurality of lenses, each lens of said plurality being adapted to bring the image of a corresponding size film to the same size for projection through the prism, the lenses each having different optical axes.
6. The editor of claim 1 wherein the movement of the lens system is laterally of the rotation axis of the said prism.
7. The editor of claim 2 wherein said supporting means includes two openings, one for each film size, each opening adapted to be placed in the said optical path, one of said openings carrying a lens.
8. The motion picture editor of claim 2, wherein said image size changing lens system, when in said optical path, is positioned between the film support means and the prism.

References Cited

UNITED STATES PATENTS 2,168,433 8/1939 Parvopassu _____ 352—119
2,297,222 9/1942 Kemna.
2,464,384 3/1949 Ehrenhaft _____ 352—119
2,906,167 9/1959 Castedello et al.

JULIA E. COINER, Primary Examiner

U.S. Cl. X.R.
352—104, 119